US011782194B1

(12) United States Patent
Mitchell

(10) Patent No.: US 11,782,194 B1
(45) Date of Patent: Oct. 10, 2023

(54) CONFIGURABLE AFOCAL IMAGER SYSTEM

(71) Applicant: WAVEFRONT RESEARCH, INC., Northampton, PA (US)

(72) Inventor: Thomas A. Mitchell, Arrington, TN (US)

(73) Assignee: Wavefront Research, Inc., Northhampton, PA (US)

( * ) Notice: Subject to any disclaimer, the term of this patent is extended or adjusted under 35 U.S.C. 154(b) by 0 days.

(21) Appl. No.: 17/838,194

(22) Filed: Jun. 11, 2022

Related U.S. Application Data

(62) Division of application No. 16/356,454, filed on Mar. 18, 2019, now Pat. No. 11,360,246.

(60) Provisional application No. 62/644,750, filed on Mar. 19, 2018.

(51) Int. Cl.
*G02B 5/02* (2006.01)
*G02B 5/08* (2006.01)
*G02B 27/10* (2006.01)

(52) U.S. Cl.
CPC .............. *G02B 5/0284* (2013.01); *G02B 5/08* (2013.01); *G02B 27/10* (2013.01); *G02B 5/0278* (2013.01)

(58) Field of Classification Search
CPC .......... G02B 5/02; G02B 5/10; G02B 5/0284; G02B 5/08; G02B 5/0278; G02B 5/0273; G02B 27/10; G02B 27/0149; G02B 7/18; G02B 7/182; G02B 7/1821; G02B 13/0055; G02B 13/0065; G02B 15/00; G02B 15/02; G02B 15/04–10; G02B 17/02; G02B 17/023; G02B 17/06; G02B 17/0621; G02B 17/0636; G02B 17/0647; G02B 17/0663; G02B 17/0694; G02B 2027/0154; G02B 2027/0156; G02B 21/0072
USPC ......................................................... 359/599
See application file for complete search history.

(56) References Cited

U.S. PATENT DOCUMENTS

| 2003/0189766 | A1* | 10/2003 | Nishioka | ............ | G02B 13/0065 |
| | | | | | 359/290 |
| 2010/0020307 | A1* | 1/2010 | Kunick | .................. | G02B 15/02 |
| | | | | | 359/861 |
| 2012/0162750 | A1* | 6/2012 | Vizgaitis | ................ | G02B 13/14 |
| | | | | | 359/354 |

* cited by examiner

*Primary Examiner* — Stephone B Allen
*Assistant Examiner* — Jyotsna V Dabbi
(74) *Attorney, Agent, or Firm* — Culhane Meadows PLLC; Orlando Lopez

(57) ABSTRACT

Configurable afocal optical system that can be configured to have different magnifications, including unity magnification, and which are capable of being cascaded to produce any number of magnifications.

9 Claims, 6 Drawing Sheets

CONFIGURABLE AFOCAL IMAGER SYSTEM

CROSS-REFERENCE TO RELATED APPLICATIONS

This application is a divisional of U.S. patent application Ser. No. 16/356,454, filed Mar. 18, 2019, entitled: CONFIGURABLE AFOCAL IMAGER SYSTEM, which claims priority of U.S. Provisional Application Ser. 62/644,750, filed Mar. 19, 2018, entitled: CONFIGURABLE AFOCAL IMAGER SYSTEM, both which are incorporated herein by reference in their entirety for all purposes whatsoever.

STATEMENT REGARDING FEDERALLY SPONSORED RESEARCH OR DEVELOPMENT

This invention was made partially with U.S. Government support from the Department of Defense under support from US Army subcontract WRI-002 (PO 22713, Prime W909MY-12-D-0008/0012), and US Army Contract W909MY-17-C-0018. The U.S. Government has certain rights to this invention.

BACKGROUND

These teachings relate generally to afocal optical systems, and, more particularly, to afocal optical systems that can be configured to have different magnifications, including unity magnification, and which are capable of being cascaded to produce any number of magnifications.

In many optical imaging systems, it is often desirable to provide multiple angular resolutions. For example, consider some applications of imaging sensors, in which it is desirable to provide a wide field of view imaging mode with coarse resolution to monitor large areas, but also provide the capability to provide a narrower field of view mode with high resolution imaging mode to gather more detail on potential targets. Consider also some applications of imaging sensors, in which it is desirable to maintain similar resolution on potential targets, but at various distances. This capability can sometimes complicate the design of optical systems as well as introduce mechanical movements that require substantial precision and accuracy, such as, for example, zoom optical systems.

There is a need for systems that provide an effective method to provide these capability.

SUMMARY

The embodiments of the configurable afocal optical system of these teachings provide an effective method to provide the above described capability.

For a better understanding of the present teachings, reference is made to the accompanying drawings and detailed description and its scope will be pointed out in the appended claims.

DETAILED DESCRIPTION

The following detailed description presents the currently contemplated modes of carrying out these teachings. The description is not to be taken in a limiting sense, but is made merely for the purpose of illustrating the general principles of the invention, since the scope of the invention is best defined by the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

These teachings relate generally to afocal optical systems, and, more particularly, to afocal optical systems that can be configured to have different magnifications, including unity magnification, and which are capable of being cascaded to produce any number of magnifications.

In many optical imaging systems, it is often desirable to provide multiple angular resolutions. For example, consider some applications of imaging sensors, in which it is desirable to provide an wide field of view imaging mode with coarse resolution to monitor large areas, but also provide the capability to provide a narrower field of view mode with high resolution imaging mode to gather more detail on potential targets. Consider also some applications of imaging sensors, in which it is desirable to maintain similar resolution on potential targets, but at various distances. This capability can sometimes complicate the design of optical systems as well as introduce mechanical movements that require substantial precision and accuracy, such as, for example, zoom optical systems. The embodiments of the configurable afocal optical system of these teachings provide an effective method to provide these capability, as described below.

Figure 1A:
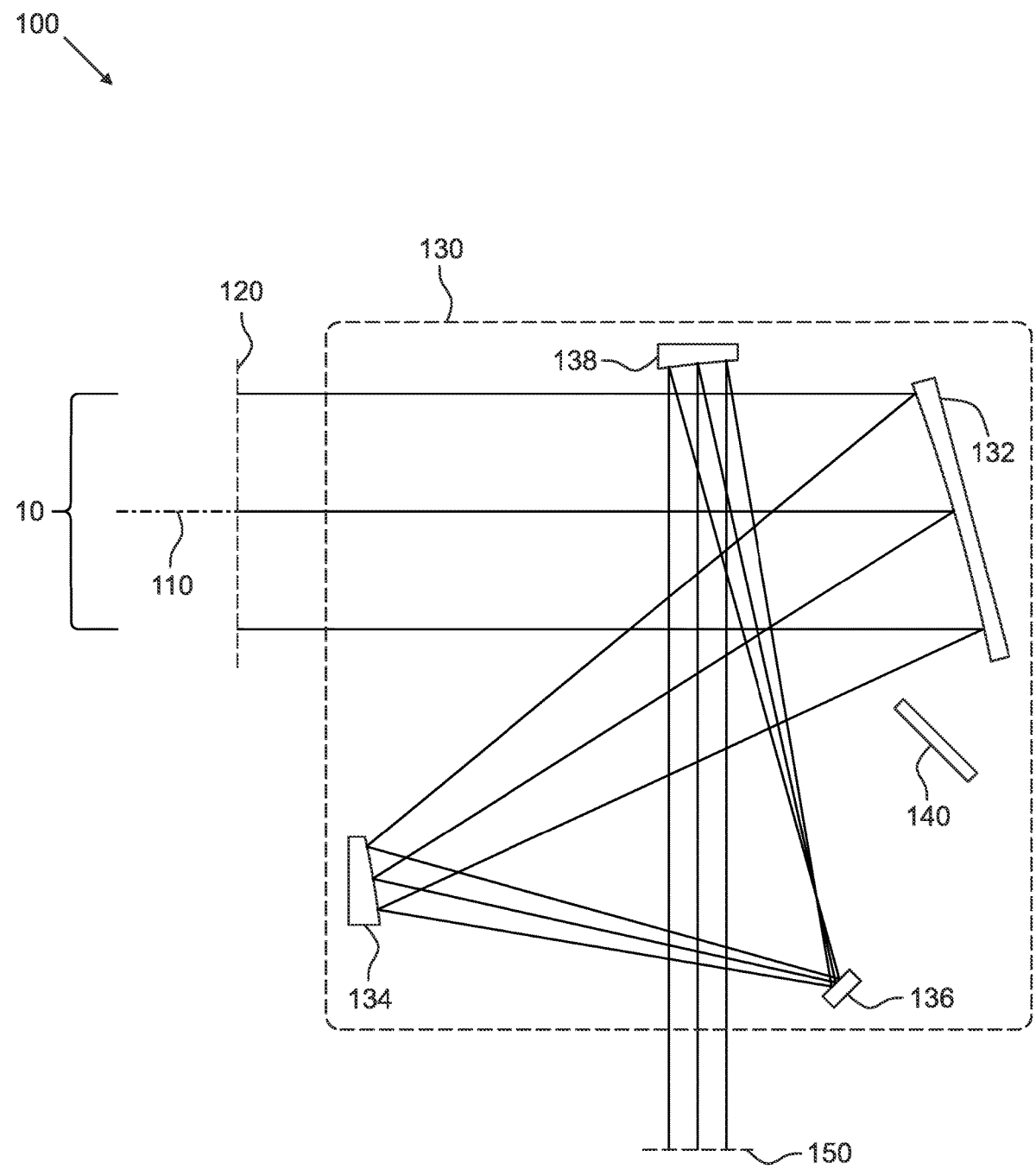
FIG. 1A is a schematic view of an embodiment of the present invention, taken along its optical axis, in a first configuration.

Reference is made to FIG. 1A, which is a schematic view of an embodiment of the present invention, taken along the optical axis, in a first configuration 100. In operation, electromagnetic radiation, typically in the ultraviolet, visible, and/or infrared bands, hereinafter referred to generally as light 10, emitted or reflected by a given object, either real or virtual, hereinafter referred to generally as the source (not shown), located at the object plane (not shown), is incident on the entrance pupil 120 of an afocal optical system 130, in this embodiment made up of, but not limited to, four reflective elements 132, 134, 136, and 138, such as, but not limited to, mirrors, and a configurable beam diverting device 140, such as, but not limited to, a moveable fold mirror, which is substantially capable of being moved into or out of the optical path. In this first configuration, the beam diverting device 140 is moved substantially out of the optical path by means of, but not limited to, translation, rotation, tilting, etc., driven by electrical, mechanical, or other means such as, but not limited to, solenoids, mechanical or motorized stages, etc., and the afocal imaging system 130 is capable of substantially receiving a portion of the light 10 from the source, and substantially reimaging the light 10 from the entrance pupil 120 to an exit pupil 140 substantially with magnification, either positive or negative, and either less than unity or greater than unity. Each of the entrance pupil 120 and exit pupil 150 may be either real or virtual, being located either outside or inside the afocal optical system 130, and may exist anywhere on or between the optical elements of the afocal optical system 130.

Figure 1B:
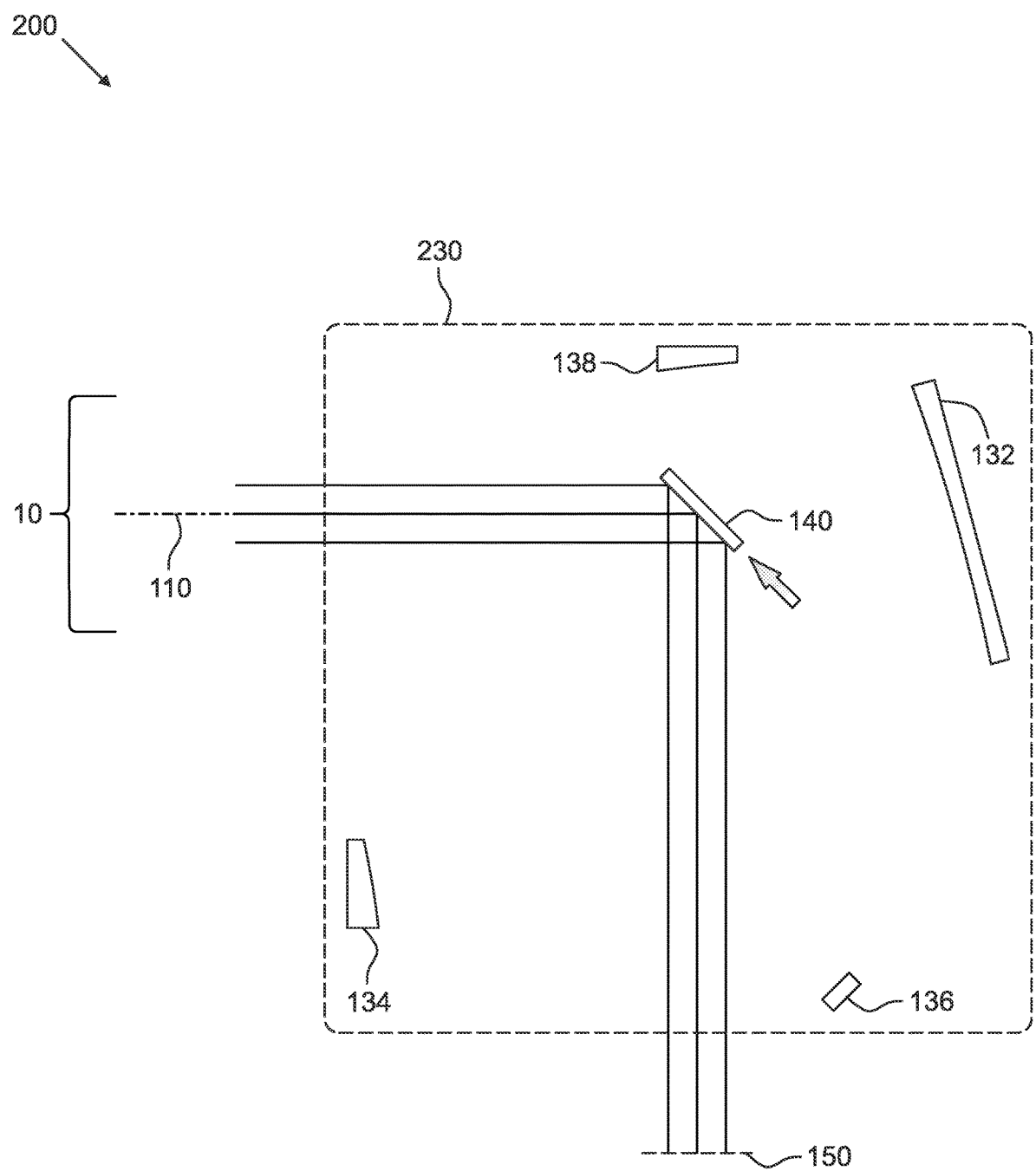
FIG. 1B is a schematic view of the embodiment of the present invention illustrated in FIG. 1A, taken along its optical axis, in a second configuration.

Reference is made to FIG. 1B, which is a schematic view of the embodiment of the present invention illustrated in FIG. 1A, taken along the optical axis, in a second configuration 200. In operation, light 10, emitted or reflected by the source (not shown), located at the object plane (not shown), is incident on the afocal optical system 230, in this embodiment made up of, but not limited to, four reflective elements 132, 134, 136, and 138, such as, but not limited to, mirrors, and a configurable beam diverting device 140, such as, but not limited to, a moveable fold mirror. In this second configuration, the beam diverting device 140 is moved substantially into the optical path by means of, but not limited to, translation, rotation, tilting, etc., driven by electrical, mechanical, or other means such as, but not limited to, solenoids, mechanical or motorized stages, etc., and is substantially capable of receiving a portion of the light 10 from the source, and substantially redirecting the light 10 to the exit pupil 140 substantially without magnification.

In this embodiment, the light 10 incident on the first afocal optical system 130 is located substantially centered on the optical axis 110 in both the first configuration 100 and second configuration 200, which allows for a reduced size in the combined beam footprints on windows and other optical elements. In other embodiments, however, the light may not be substantially centered on a common optical axis.

Figure 2A:
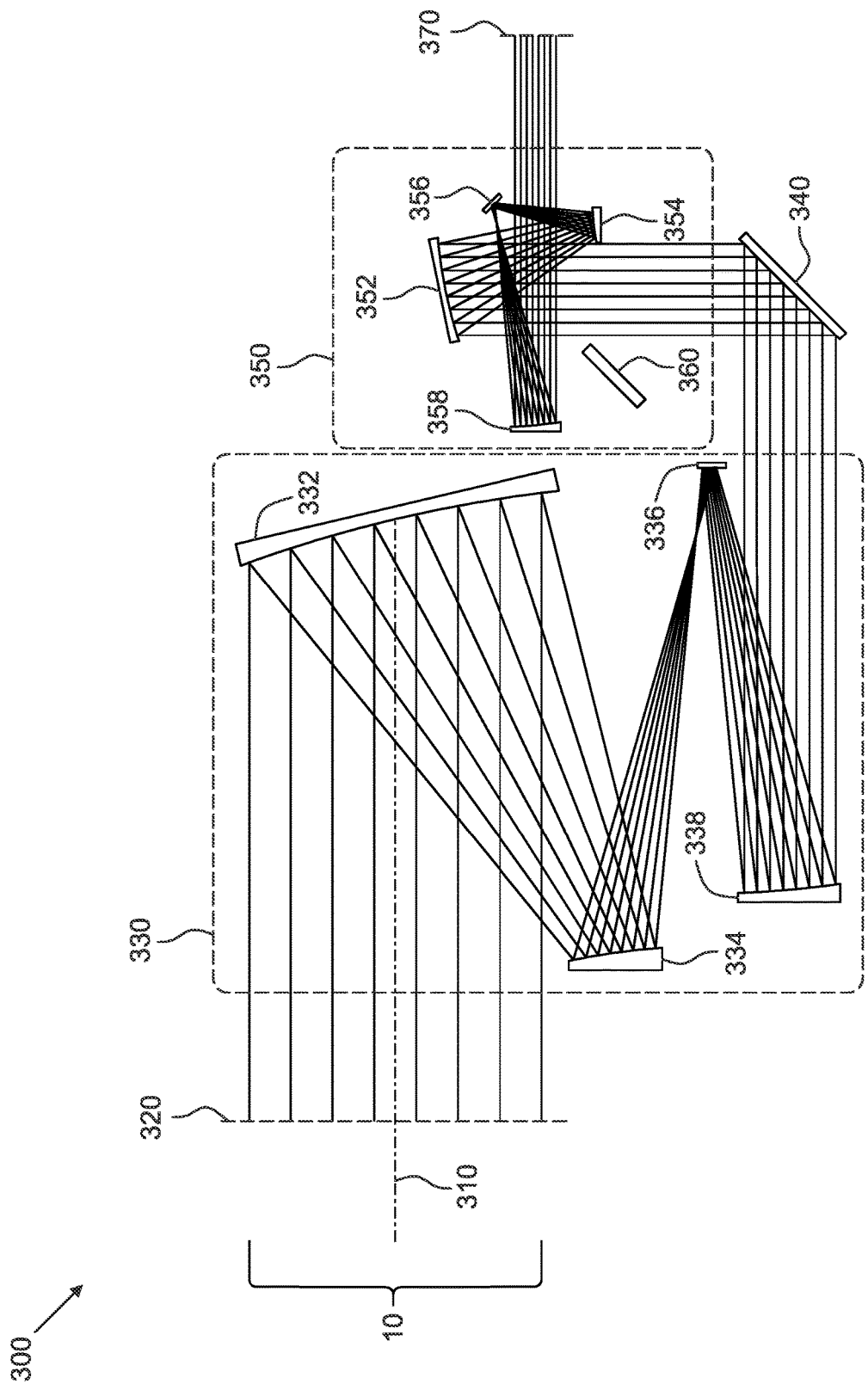
FIG. 2A is a schematic view of another embodiment of the present invention, taken along its optical axis, in a first configuration.

Reference is made to FIG. 2A, which is a schematic view of an embodiment of the present invention, taken along the optical axis, in a first configuration 300. In operation, light 10, emitted or reflected by the source (not shown), located at the object plane (not shown), is incident on the entrance pupil 320 of a first afocal optical system 330, in this embodiment made up of, but not limited to, four reflective elements 332, 334, 336, and 338, such as, but not limited to, mirrors, which is capable of substantially receiving a portion of the light 10 from the source, and substantially reimaging the light 10 from the source substantially with magnification, either positive or negative, and either less than unity or greater than unity. The light is then incident on a fold mirror 240, which is substantially capable of receiving the light from the first afocal imaging system 330, and redirecting the light onto a second afocal imaging system 350, in this embodiment made up of, but not limited to, four reflective elements 352, 354, 356, and 358, such as, but not limited to, mirrors, and a configurable beam diverting device 360, such as, but not limited to, a moveable fold mirror, which is substantially capable of being moved into or out of the optical path. In this first configuration, the beam diverting device 360 is moved substantially out of the optical path by means of, but not limited to, translation, rotation, tilting, etc., and the second afocal imaging system 350 is capable of substantially receiving a portion of the light from the fold mirror 340, and substantially reimaging the light to an exit pupil 370 substantially with magnification, either positive or negative, and either less than unity or greater than unity. Each of the entrance pupil 320 and exit pupil 370 may be either real or virtual, being located either outside or inside the afocal optical systems 330 or 350, and may exist anywhere on or between the optical elements of the afocal optical systems 330 or 350.

Figure 2B:
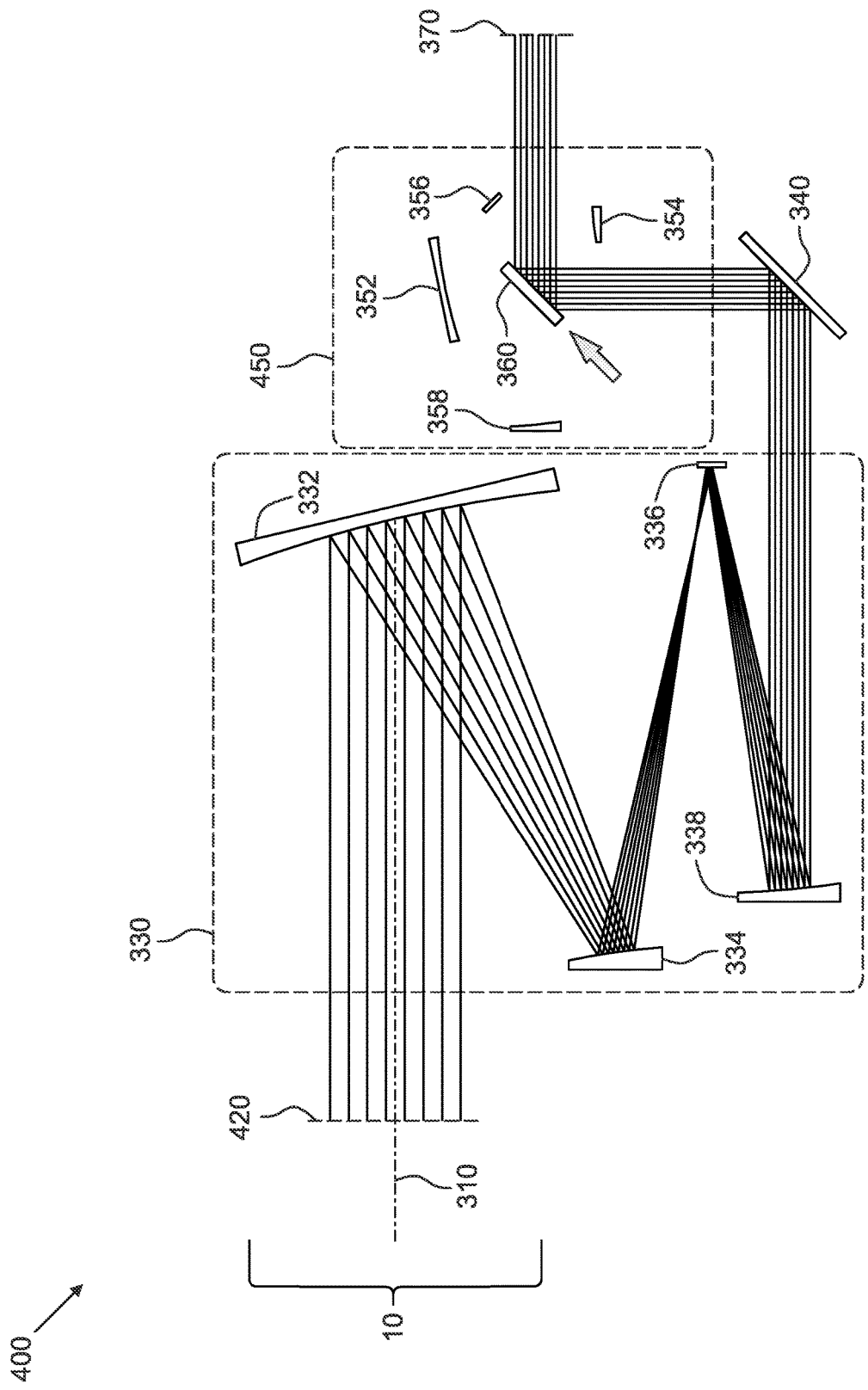
FIG. 2B is a schematic view of the embodiment of the present invention illustrated in FIG. 2A, taken along its optical axis, in a second configuration.

Reference is made to FIG. 2B, which is a schematic view of the embodiment of the present invention illustrated in FIG. 2A, taken along the optical axis, in a second configuration 400. In operation, light 10, emitted or reflected by the source (not shown), located at the object plane (not shown), is incident on the first afocal optical system 330, in this embodiment made up of, but not limited to, four reflective elements 332, 334, 336, and 338, such as, but not limited to, mirrors, which is capable of substantially receiving a portion of the light 10 from the source, and substantially reimaging the light 10 from the source substantially with magnification, either positive or negative, and either less than unity or greater than unity. The light is then incident on a fold mirror 240, which is substantially capable of receiving the light from the first afocal imaging system 330, and redirecting the light onto a second afocal imaging system 350, in this embodiment made up of, but not limited to, four reflective elements 352, 354, 356, and 358, such as, but not limited to, mirrors, and a configurable beam diverting device 360, such as, but not limited to, a moveable fold mirror. In this second configuration, the beam diverting device 360 is substantially moved into the optical path by means of, but not limited to, translation, rotation, tilting, etc., and is substantially capable of receiving a portion of the light from the fold mirror 340, and substantially redirecting the light to the exit pupil 370 substantially without magnification.

In this embodiment, the fold mirror 240 provides an orientation between the first afocal optical system 330 and the second afocal optical system 350 such that the direction of the light incident on the entrance pupil 320 is substantially the same as light reimaged to the exit pupil 370, which allows for potential benefits with packaging of the optical system. In other embodiments, however, the orientation of the light reimaged to the exit pupil 370 may be substantially different from the light incident on the entrance pupil, and in still other embodiments there may not be a fold mirror.

In this embodiment, the light 10 incident on the first afocal optical system 330 is located substantially centered on the optical axis 310 in both the first configuration 300 and second configuration 400, which allows for a reduced size in the combined beam footprints on windows and other optical elements. In other embodiments, however, the light may not be substantially centered on a common optical axis.

Figure 3A:
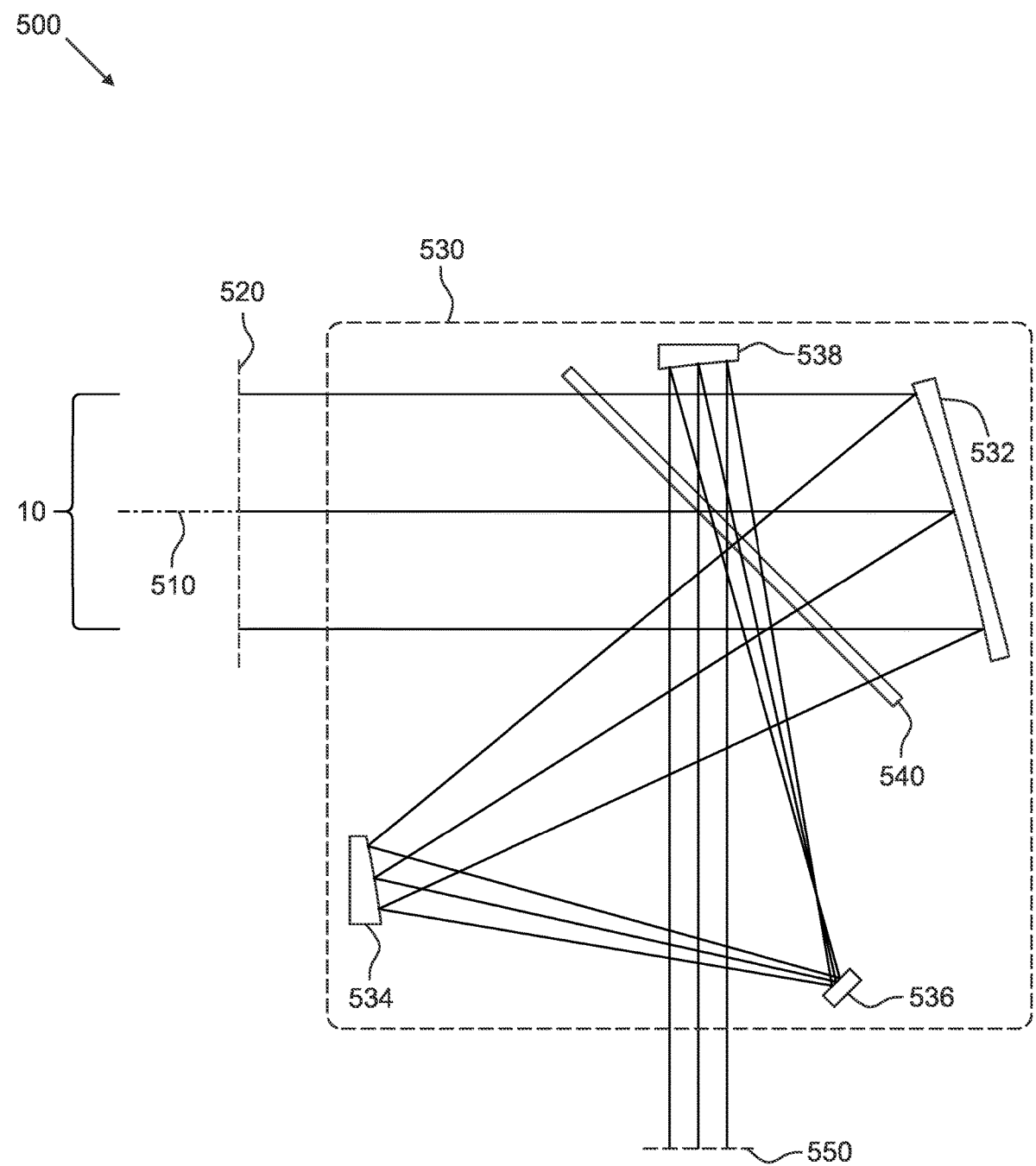
FIG. 3A is a schematic view of a further embodiment of the present invention, taken along its optical axis, in a first configuration.

Reference is made to FIG. 3A, which is a schematic view of an embodiment of the present invention, taken along the optical axis, in a first configuration 500. In operation, light 10, emitted or reflected by the source (not shown), located at the object plane (not shown), is incident on the entrance pupil 520 of an afocal optical system 530, in this embodiment made up of, but not limited to, four reflective elements 532, 534, 536, and 538, such as, but not limited to, mirrors, and a configurable beam diverting device 540, such as, but not limited to, a configurable fold mirror, which is substantially capable of having its transmission and reflection characteristics modified. In this first configuration, the beam diverting device 540 is configured to transmit a portion of the light by means of, but not limited to, switchable liquid crystal or polymer-dispersed liquid crystal (PDLC) mirrors, electro-optic switchable elements, etc., and the afocal imaging system 530 is capable of substantially receiving a portion of the light 10 from the source, and substantially reimaging the light 10 from the entrance pupil 520 to an exit pupil 540 substantially with magnification, either positive or negative, and either less than unity or greater than unity. Each of the entrance pupil 520 and exit pupil 550 may be either real or virtual, being located either outside or inside the afocal optical system 530, and may exist anywhere on or between the optical elements of the afocal optical system 530.

Figure 3B:
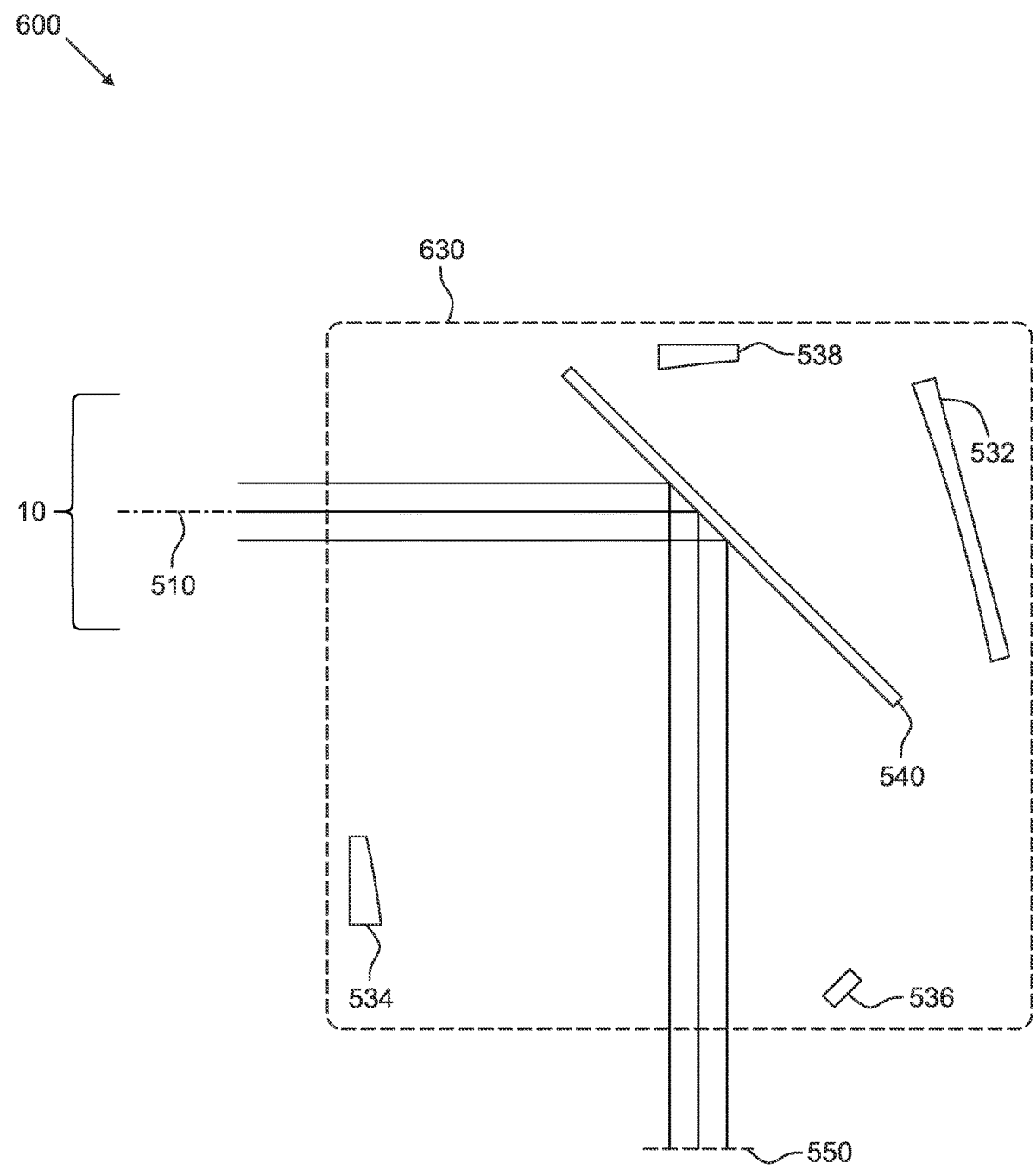
FIG. 3B is a schematic view of the embodiment of the present invention illustrated in FIG. 3A, taken along its optical axis, in a second configuration.

Reference is made to FIG. 3B, which is a schematic view of the embodiment of the present invention illustrated in FIG. 3A, taken along the optical axis, in a second configuration 600. In operation, light 10, emitted or reflected by the source (not shown), located at the object plane (not shown), is incident on the optical system 630, in this embodiment made up of, but not limited to, four reflective elements 532, 534, 536, and 538, such as, but not limited to, mirrors, and a configurable beam diverting device 540, such as, but not limited to, a configurable fold mirror, which is substantially capable of having its transmission and reflection characteristics modified. In this second configuration, the beam diverting device 540 is configured to reflect a portion of the light by means of, but not limited to, switchable liquid crystal or PDLC mirrors, electro-optic switchable elements, etc., and is substantially capable of receiving a portion of the light 10 from the source, and substantially redirecting the light 10 to the exit pupil 540 substantially without magnification.

In this embodiment, the light 10 incident on the first afocal optical system 530 is located substantially centered on the optical axis 510 in both the first configuration 530 and second configuration 630, which allows for a reduced size in the combined beam footprints on windows and other optical elements. In other embodiments, however, the light may not be substantially centered on a common optical axis.

Any number of afocal optical systems can be used in the embodiments of the present invention, including those with and without configurable beam diverting devices, and can be cascaded in any order to provide any number of magnifications. For example, a configuration of three afocal optical systems with magnifications of 1.39×, 1.93×, and 3.73×, each with configurable beam diverting devices, can be cascaded to provide a series of eight unique afocal magnifications from unity to 10×. Each of the afocal optical systems can be reflective, refractive, diffractive, or catadioptric in form, and do not need to be all the same.

While term "afocal" has been used to describe the optical systems in the present teachings, this term is meant in the general sense of optical systems that are substantially collimated at both their entrance and exit pupils, but are not strictly limited to optical systems having infinite object and image distances. For example, optical systems having large, but not infinite object and/or image distances would still be embodiments of the present invention.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although these teachings have been described with respect to various embodiments, it should be realized these teachings are also capable of a wide variety of further and other embodiments within the spirit and scope of the appended claims.

The invention claimed is:

1. An optical imaging system comprising:
   a first optical sub-system having at least one first optical element;
   said first optical sub-system being optically disposed to substantially receive light from a source;
   said first optical sub-system having an entrance pupil;
   a second optical sub-system having at least one second optical element, wherein the second optical sub-system is afocal;
   said first optical sub-system being also optically disposed to substantially redirect a portion of said light from said entrance pupil to said second optical sub-system;
   said second optical sub-system being optically disposed to substantially receive said portion of said light from said first optical sub-system;
   said second optical sub-system having an exit pupil;
   said second optical sub-system being also optically disposed to substantially redirect a portion of said light from said first optical sub-system to said exit pupil;
   a beam diverting device;
   said beam diverting device being configured to reconfigure an optical path of said second optical sub-system; and
   wherein said second optical sub-system is configurable such that when said beam diverting device is optically disposed to substantially receive a portion of said light from said first optical sub-system, said beam diverting device substantially redirects said portion of said light to said exit pupil.

2. The optical imaging system of claim 1 wherein said first optical sub-system is substantially afocal.

3. The optical imaging system of claim 1 wherein one of the at least one first optical element or the at least one second optical element is reflective.

4. The optical imaging system of claim 1 wherein one of the at least one first optical element or the at least one second optical element is refractive.

5. The optical imaging system of claim 1 wherein said beam diverting device is substantially moveable.

6. The optical imaging system of claim 5 wherein said beam diverting device is a reflective fold mirror.

7. The optical imaging system of claim 1 wherein said beam diverting device is substantially capable of having its transmission and reflection properties modified.

8. The optical imaging system of claim 7 wherein said beam diverting device is an electrically configurable mirror.

9. The optical imaging system of claim 8 wherein said beam diverting device is a polymer-dispersed liquid crystal mirror.

* * * * *